(12) United States Patent
Tamura et al.

(10) Patent No.: US 10,625,739 B2
(45) Date of Patent: Apr. 21, 2020

(54) VEHICLE CONTROL APPARATUS AND VEHICLE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Kei Tamura, Kariya (JP); Yosuke Ito, Kariya (JP); Akitoshi Minemura, Kariya (JP); Jun Tsuchida, Okazaki (JP); Masayuki Shimizu, Numazu (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 317 days.

(21) Appl. No.: 15/578,662

(22) PCT Filed: May 31, 2016

(86) PCT No.: PCT/JP2016/066020
§ 371 (c)(1),
(2) Date: Nov. 30, 2017

(87) PCT Pub. No.: WO2016/194900
PCT Pub. Date: Dec. 8, 2016

(65) Prior Publication Data
US 2018/0154892 A1 Jun. 7, 2018

(30) Foreign Application Priority Data
Jun. 2, 2015 (JP) .................................. 2015-112613

(51) Int. Cl.
*B60W 30/095* (2012.01)
*G06K 9/00* (2006.01)
(Continued)

(52) U.S. Cl.
CPC ........ *B60W 30/0956* (2013.01); *B60W 50/14* (2013.01); *G01S 13/867* (2013.01);
(Continued)

(58) Field of Classification Search
CPC ............. B60W 30/0956; B60W 50/14; B60W 2540/12; B60W 2540/18; B60W 2550/22;
(Continued)

(56) References Cited

U.S. PATENT DOCUMENTS 8,090,537 B2 * 1/2012 Nishira ................ G05D 1/0214
340/436
9,224,299 B2 * 12/2015 Taguchi ................ B60W 30/08
(Continued)

FOREIGN PATENT DOCUMENTS

| JP | 2007-008300 A | 1/2007 |
| JP | 2012-008696 A | 1/2012 |
| JP | 2013-173404 A | 9/2013 |

*Primary Examiner* — Jaime Figueroa
(74) *Attorney, Agent, or Firm* — Knobbe, Martens, Olson & Bear, LLP

(57) ABSTRACT

A vehicle control apparatus accumulates a history of timings of avoidance operations performed by a driver of with respect to objects that are at prescribed distances ahead of a host vehicle, and calculates a distribution of the timings of the avoidance operations. Based on the distribution of the timings of the avoidance operations, the vehicle control apparatus sets the output timing of a warning to the driver such that interference does not occur between the avoidance operation and an avoidance operation that is actually performed by the driver, and furthermore the vehicle control apparatus judges the risk of a collision with the host vehicle, with the judgement based on the position of an object that is ahead of the host vehicle, and changes the output timing of the warning based on results of the judgement of risk.

13 Claims, 11 Drawing Sheets

(51) Int. Cl.
*G01S 13/93* (2020.01)
*B60W 50/14* (2020.01)
*B60W 50/00* (2006.01)
*G01S 13/86* (2006.01)
*G08G 1/16* (2006.01)
*G01S 13/931* (2020.01)
*G01S 7/41* (2006.01)

(52) U.S. Cl.
CPC ........ G01S 13/931 (2013.01); G06K 9/00791 (2013.01); G06K 9/00805 (2013.01); G08G 1/166 (2013.01); *G01S 7/41* (2013.01); *G01S 2013/9346* (2013.01)

(58) Field of Classification Search
CPC ..... B60W 2050/0089; B60W 2520/14; B60W 2520/10; B60W 30/0953; B60W 2050/143; B60W 2550/30; G06K 9/00805; G06K 9/00791; G01S 13/867; G01S 13/931; G01S 2013/9346; G01S 7/41; G08G 1/166
USPC .................................................... 701/1, 301
See application file for complete search history.

(56) References Cited

U.S. PATENT DOCUMENTS

| | | | | |
|---|---|---|---|---|
| 9,283,968 B2* | 3/2016 | Yamada | ............ | B60W 50/0098 |
| 9,682,703 B2* | 6/2017 | Okita | ................ | B60W 30/08 |
| 10,140,867 B2* | 11/2018 | Kodama | .................. | G08G 1/16 |
| 2004/0193347 A1* | 9/2004 | Harumoto | ........... | B60R 21/0132 |
| | | | | 701/45 |
| 2005/0021224 A1* | 1/2005 | Gray | .................. | B60H 1/00771 |
| | | | | 701/36 |
| 2005/0080565 A1* | 4/2005 | Olney | ................ | B60K 31/0008 |
| | | | | 701/301 |
| 2007/0078600 A1* | 4/2007 | Fregene | ............. | G01S 13/9303 |
| | | | | 701/301 |
| 2007/0288133 A1* | 12/2007 | Nishira | ................ | G05D 1/0214 |
| | | | | 701/23 |
| 2010/0209890 A1* | 8/2010 | Huang | ..................... | G09B 9/05 |
| | | | | 434/65 |
| 2011/0210867 A1* | 9/2011 | Benedikt | .................. | G08G 1/01 |
| | | | | 340/905 |
| 2013/0154854 A1* | 6/2013 | Chen | ................ | G08G 1/096741 |
| | | | | 340/905 |
| 2014/0032089 A1* | 1/2014 | Aoude | ..................... | G08G 1/00 |
| | | | | 701/117 |
| 2014/0142839 A1* | 5/2014 | Kaminade | ............. | G08G 1/166 |
| | | | | 701/301 |
| 2014/0350813 A1* | 11/2014 | Jeon | ...................... | B60W 30/09 |
| | | | | 701/70 |
| 2015/0232090 A1* | 8/2015 | Jeon | .................... | B60W 30/095 |
| | | | | 701/41 |
| 2015/0348412 A1* | 12/2015 | Onishi | ............ | G08G 1/096791 |
| | | | | 340/905 |

* cited by examiner (a)

(b)

(a)

PRECEDING VEHICLE OVERLAP RATIO (b)

HOST VEHICLE LANE OVERLAP RATIO

VEHICLE CONTROL APPARATUS AND VEHICLE CONTROL METHOD

CROSS-REFERENCE TO RELATED APPLICATIONS

This application is based on and incorporates herein by reference Japanese Patent First Application No. 2015-112613 filed on Jun. 2, 2015.

TECHNICAL FIELD

The present disclosure relates to a vehicle control apparatus and a vehicle control method which outputs warnings for preventing collisions between a host vehicle and an object.

BACKGROUND ART

Safety systems such as a PCS (Pre-Crash Safety System) have been developed for avoidance, or for reducing damage caused by a collision. With such a safety system, a warning is outputted when a preceding vehicle approaches the host vehicle. However if the timing of the warning is too early, then there is a risk that the outputting of the warning may interfere with operations performed by the driver of the host vehicle for avoiding the object, and may cause a feeling of unease to the driver.

With the patent of PTL 1, a history is accumulated of the timings at which avoidance operations were performed by the driver at occasions when prescribed distances were reached between the host vehicle and preceding vehicles. A warning is given to the driver based on comparing an actual operation performed by the driver with the accumulated history of timings of avoidance operations. It is intended in that way to prevent interference between the timing of outputting a warning and the timing of an operation performed by the driver for avoiding an object.

CITATION LIST

Patent Literature

[PTL 1] JP-A-2012-8696

SUMMARY OF THE INVENTION

Technical Problem

However the risk of collision between the host vehicle and a preceding vehicle varies in accordance with the position relationship between these vehicles in the vehicle width direction, and with the condition in which the preceding vehicle is approaching the host vehicle, etc. In document PTL 1, such factors are not taken into consideration, and there is room for improvement in implementing appropriate providing of warnings to a driver.

It is an objective of the present disclosure to overcome the above problem, by providing a technology which can more appropriately determine the timings of warnings to the driver.

Solution of Problem

One form of a vehicle control apparatus according to the present invention comprises a distribution calculation section, a warning output setting section, a judgement section and a change section. The distribution calculation section accumulates a history of the timings of avoidance operations performed by the driver of a host vehicle (M1) for objects (M2, M3) that are at prescribed distances ahead of the host vehicle, and calculates the distribution of the timings of these avoidance operations. Based on the timings of the avoidance operations, the warning output setting section sets the output timings of the warnings that are sent to the driver, such that the warnings will not interfere with the avoidance operations actually performed by the driver. The judgement section judges the degree of risk of a collision with the host vehicle, based on the position of an object that is ahead of the host vehicle. The change section changes the timing that is set by the warning output setting section for outputting a warning, with the change being based on the risk of collision with the host vehicle.

With such a vehicle control apparatus, the risk of collision with the host vehicle is judged based on the positions of objects that are ahead of the host vehicle. The timing of outputting a warning, which has been set based on the distribution of the timings of avoidance operations, is changed based on the judgement results. In that way, interference between the warnings and the avoidance operations performed by the driver can be prevented, that is to say, the outputting of unnecessary warnings to the driver can be prevented.

The above, and other objectives, features and advantages will be made clear, and can be sufficiently understood, by reading the following detailed description and the appended drawings.

DESCRIPTION OF EMBODIMENTS

An embodiment of the present invention is described in more detail in the following referring to the appended drawings. However the present invention may be implemented in various different forms, and is not to be understood as being limited to the embodiment. The embodiment is provided for enabling a thorough and complete understanding of the disclosure of the present invention, and to fully convey the scope of the invention to skilled persons. Throughout the drawings, similar constituent elements are indicated by similar designation symbols.

The vehicle control system of this embodiment is installed in a vehicle (hereinafter referred to as the host vehicle), detects objects that are positioned ahead of the host vehicle, and functions as a PCS system that executes various type of control which are appropriate for avoiding collision with such objects, or for lessening the collision effects.

Figure 1A:
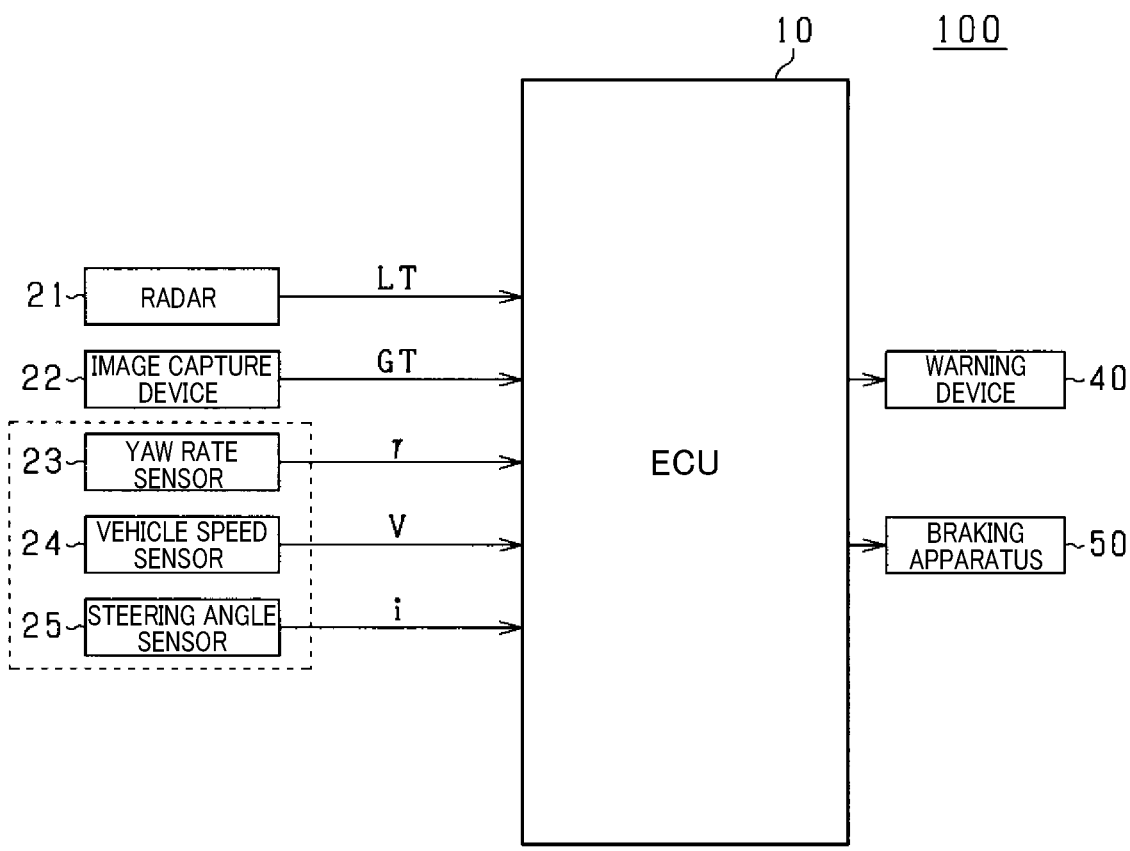
FIG. 1A is a diagram of the general configuration of a vehicle control system according to an embodiment of the present invention.

In FIG. 1, a vehicle control system 100 that is installed in the host vehicle is equipped with an ECU (Electronic Control Unit) 10, a radar apparatus 21, an image capture device 22, various sensors, a warning device 40, and a braking apparatus 50.

Figure 2:
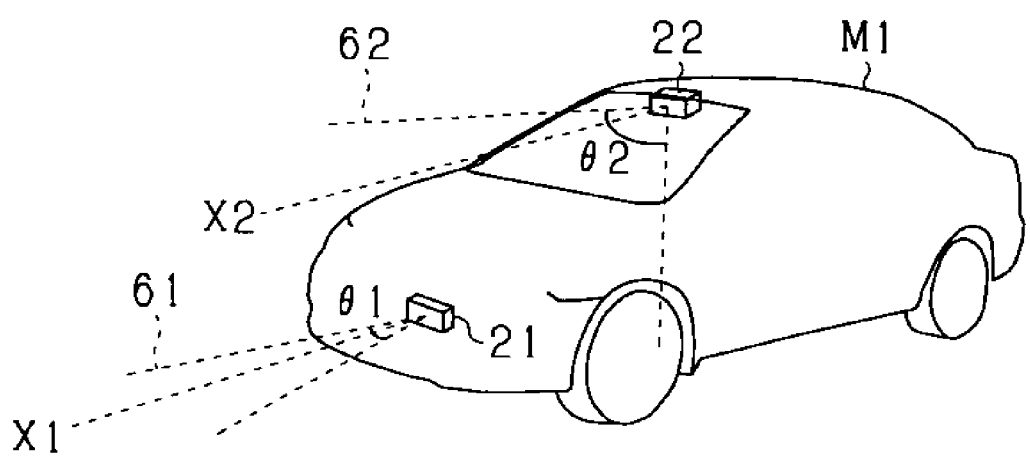
FIG. 2 is a diagram showing the installation conditions of an imaging apparatus and a radar apparatus in a host vehicle.

The radar apparatus 21 emits electromagnetic waves having directionality such as millimeter-band waves, laser light, etc., using these for detecting a radar object LT that is positioned ahead of the host vehicle. As shown in FIG. 2, the radar apparatus 21 is mounted at a forward part of the host vehicle M1, installed such that the optical axis X1 of the radar apparatus 21 is directed ahead of the vehicle. At each of successive prescribed intervals, a radar signal from the radar apparatus 21 scans a region within a prescribed angular range θ1 ahead of the host vehicle, centered on the optical axis X1, while also receiving reflected electromagnetic waves from the surfaces of external objects, which are inputted to the ECU 10.

The radar apparatus 21 detects an object when the reflected radar waves from the object are above a prescribed reception strength. For that reason, each time the radar apparatus 21 receives radar waves having a signal strength that is above the prescribed value, this is taken to indicate that one radar object LT has been received, and that radar object is inputted to the ECU 10.

A radar object LT includes information expressing the distance and relative speed of an object, with respect to the advancement direction of the host vehicle, and lateral position information expressing the position of the object in the width direction of the host vehicle, etc.

The image capture device 22 includes a CCD camera, a single-lens camera, stereo camera, etc., and as shown in FIG. 2 is positioned close to the lower edge of the windshield of the host vehicle. At prescribed intervals, the image capture device 22 captures images of a region 62 that extends in a prescribed angular range θ2, oriented ahead of the host vehicle and centered on an imaging axis X2. An object is thereby acquired as an image object GT, by image processing of the captured images, and the image object GT is inputted to the ECU 10.

In addition to the distance and relative speed of an object with respect to the advancement direction of the host vehicle, and lateral position information expressing the position of the object in the width direction of the host vehicle, the image object GT includes information on the lateral position of an object. Hence the ECU 10 can identify an image object GT as information having a prescribed width.

Sensors including a yaw rate sensor 23, a vehicle speed sensor 24, and a steering angle sensor 25 are provided. The yaw rate sensor 23 is a known type of sensor that detects the angular rotation speed (yaw rate γ) of the vehicle, and the vehicle speed sensor 24 detects the speed of the host vehicle (host vehicle speed V) based on the rotation speed of the road wheels. The steering angle sensor 25 detects the angle to which the steering wheel is rotated, as the steering angle.

The warning device 40 consists of a loudspeaker, a display, etc. and outputs warnings in a condition whereby they can be identified by the driver using audible and visual perception, i.e., warnings that are outputted as sounds, images, etc.

The braking apparatus 50 uses a seat belt, brakes, etc., to reduce injury to the driver in a collision, by tightening the seat belt, and to reduce the speed at which a collision occurs, by applying the brakes.

The ECU 10 is an electronic control unit which controls the electrical circuits, and is mainly configured of a CPU (central processing unit), a ROM (read-only memory a RAM (random access memory), input/output interface, etc. The various functions of the ECU 10 (see FIG. 1B) are implemented by the ECU 10 in executing a program that is stored in the ROM. The ECU 10 detects objects that are external to the host vehicle (vehicles, obstacles, pedestrians) based on information on the various objects that is obtained by the radar apparatus 21 and the image capture device 22. If it is judged that there is a possibility of collision with these objects, and judged that the probability of collision is high, the warning device 40 and the braking apparatus 50 are put into operation.

The ECU 10 changes over the operation state of the warning device 40 in accordance with the degree of urgency of collision between the host vehicle and an object (preceding vehicle, oncoming vehicle, etc.). For example when the degree of urgency of collision is low, vocal guidance is outputted, explaining that there is an object. When the degree of urgency of collision is medium, a warning sound is directed to the driver, from a direction that is in accordance with the position of the object. When the degree of urgency of collision is high, a PRE (Perceptual Risk Estimate) collision warning is outputted, for prompting the driver to perform avoidance of the object.

The PRE collision warning should preferably be outputted by the warning device 40 as soon as possible, however if the timing of the PRE collision warning is too early, the output timing may interfere with collision operations performed by the driver, and cause feelings of unease to the driver.

Hence, the ECU 10 acquires the distribution of the frequency of avoidance operations performed by the driver, by accumulating a history of the timings of avoidance operations performed by the driver when a preceding vehicle has reached prescribed distances from the host vehicle, in the advancement direction of the host vehicle. For example the frequency of avoidance operations performed by the driver shown in FIG. 3 is obtained by monitoring the timings at which the driver steps on the brake, to effect avoidance, in a scene in which the host vehicle and a preceding vehicle have approached one another to within a prescribed distance.

Figure 3:
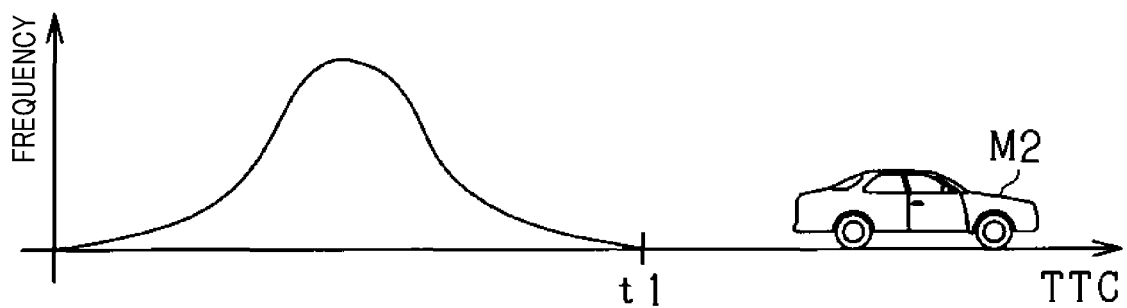
FIG. 3 is a diagram showing the relationship between the distribution of avoidance operations performed by a driver and the output timings of collision warnings.

In FIG. 3, the horizontal axis expresses values of TTC (Time to Collision), corresponding to the time that will elapse until the host vehicle collides with an object such as the preceding vehicle M2, etc., that is ahead of the host vehicle. The TTC is an evaluation value, expressing the number of seconds that will elapse until the host vehicle collision, if the host vehicle speed Vs were to be maintained unchanged, and normally, the smaller the value of the TTC, the higher is the risk of collision (right side of FIG. 3), while the greater the value of the TTC, the lower is the risk of collision (left side of FIG. 3).

With such a correspondence relationship between the distribution of frequency of avoidance operations performed by the driver and the TTC, when a PRE collision warning is outputted to the driver, and the PRE warning is within a range of TTC values in which there is a high frequency of avoidance operations performed by the driver, there is a risk that there will be interference between an avoidance operation by the driver and the PRE collision warning, Hence, the output timing of the PRE collision warning is set such as to be later than a TTC timing (for example the time point t1) at which there would be a possibility of the driver performing an avoidance operation. In that way, interference between avoidance operations of the driver and a PRE collision warning can be prevented.

It should be noted that the risk of collision between a preceding vehicle and the host vehicle changes in accordance with the position relationship between the host vehicle and the preceding vehicle, the state of proximity of the preceding vehicle to the host vehicle, etc. In a case in which the risk of collision is low, it is conceivable that the host vehicle driver will delay performing an avoidance operation after noticing an object that is ahead of the host vehicle. Hence when the risk of collision is low, even if the PRE collision warning is outputted at a timing that has been determined based on an avoidance model of the driver, there is a possibility that interference will occur between an avoidance operation performed by the driver and the output timing of the PRE collision warning.

Hence, the ECU 10 changes the output timing of a PRE collision warning by taking into consideration the risk of collision for the host vehicle, thereby restraining the outputting of unnecessary PRE collision warnings.

Figure 4:
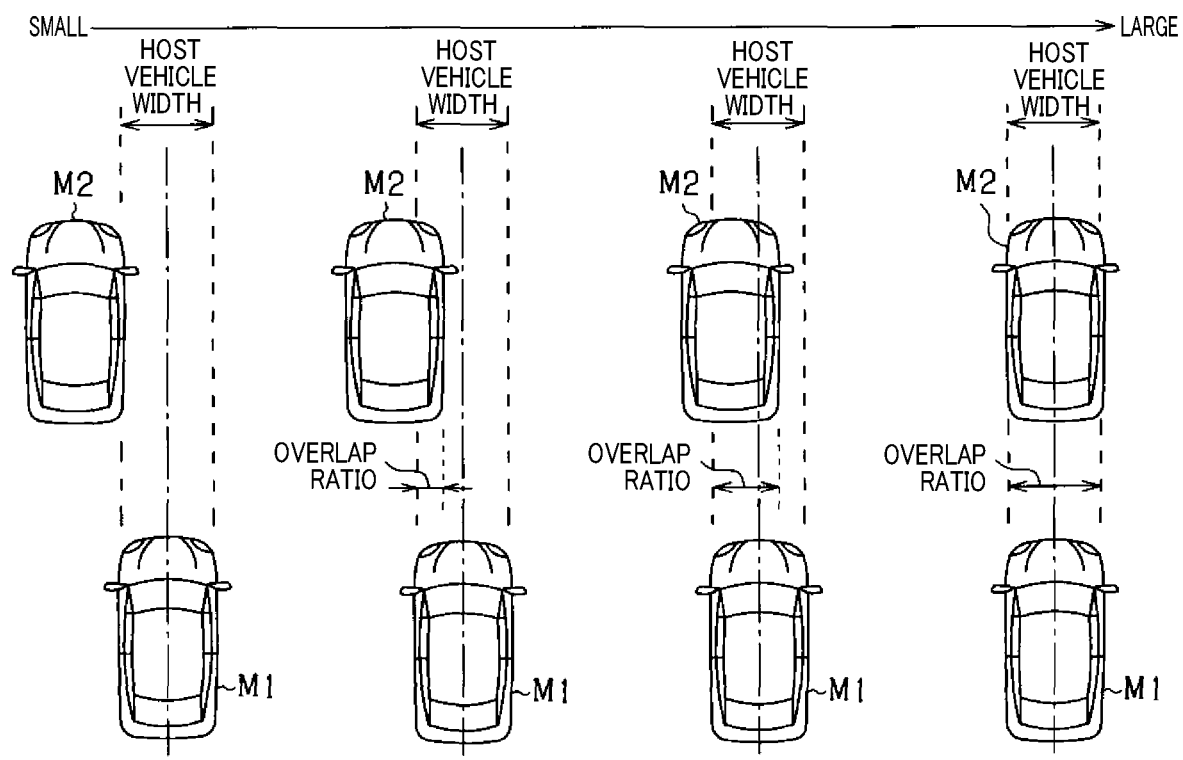
FIG. 4 is a diagram showing an overlap state between a preceding vehicle and the host vehicle.

For example as shown in FIG. 4, in a case in which a preceding vehicle M2 is positioned ahead of the host vehicle M1, and the vehicle width of the host vehicle (host vehicle width) overlaps the vehicle width of the preceding vehicle M2, the risk of collision will vary in accordance with the state of overlap (overlap ratio). That is to say, in FIG. 4, the smaller the overlap ratio between the host vehicle M1 and the preceding vehicle M2 (hereinafter referred to as the preceding vehicle overlap ratio), (i.e., the closer to the left side of the paper), the lower becomes the risk of collision, and it can be envisaged that a delay will thereby occur in a control operation performed by the driver after noticing the preceding vehicle M2.

In a case in which there is overlap in the host vehicle lane between the lateral positions of the host vehicle M1 and a preceding vehicle M2 that is positioned ahead of the host vehicle M1, the ECU 10 obtains the preceding vehicle overlap ratio as a parameter expressing the risk of collision. The output timing of the PRE collision warning, that has been set based on the driving history of the driver, is changed based on the preceding vehicle overlap ratio. That is to say, the smaller the preceding vehicle overlap ratio, the greater is the possibility of a delay in the timing of an avoidance operation by the driver, and so the outputting the PRE collision warning is changed accordingly, to occur at a later timing.

Figure 5:
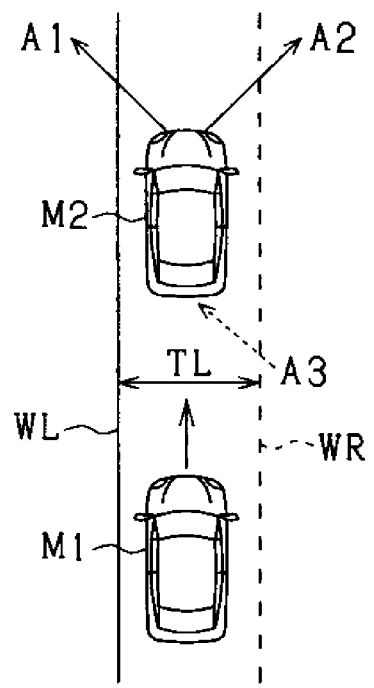
FIG. 5 is a diagram showing an overlap state between another traffic lane and the host vehicle.
Figure 5:
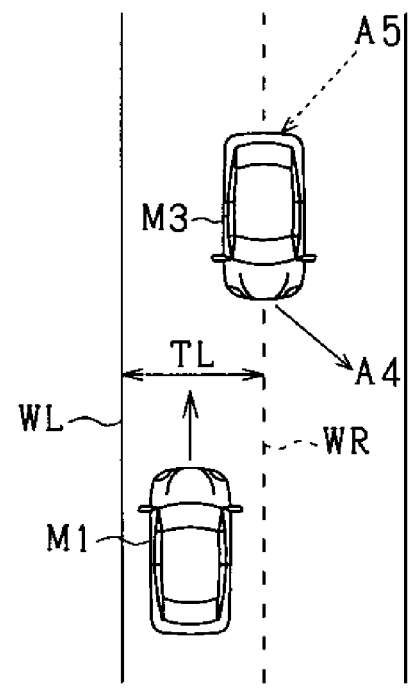

As shown in FIGS. 5(a) and 5(b), in a case in which a preceding vehicle M2 or an oncoming vehicle M3 straddles one of the right-side and left-side positioned white lines WL, WR of the host vehicle lane in which the host vehicle M1 is travelling (or if there is a possibility of such straddling), it is possible that the preceding vehicle M2 or the oncoming vehicle M3 may change its direction of advancement, and in such a case too, there is a possibility of change in the risk of collision with the host vehicle M1.

For example as shown in FIG. 5(a), if the preceding vehicle M2 were to move away from the host vehicle M1 in a direction A1 or A2 (i.e., to another traffic lane), the risk of collision would be reduced. On the other hand, if the preceding vehicle M2 were to move in a direction A3, the risk of collision would be increased. Furthermore as shown in FIG. 5(b), if the oncoming vehicle M3 were to move away from the host vehicle M1 in a direction A4, the risk of collision would be reduced. However if the oncoming vehicle M3 were to move closer to the host vehicle M1 in a direction A5, the risk of collision would be increased.

Hence in a case in which a preceding vehicle M2 (or an oncoming vehicle M3) has passed over the white line WL (or the white line WR), to overlap the host vehicle lane, the ECU 10, functioning as a displacement condition judgement section 33, judges whether the preceding vehicle M2 (or oncoming vehicle M3) is moving closer to, or is moving away from, the host vehicle M1. In the moving-closer condition and in the moving-away condition, the lateral speed of the preceding vehicle M2 (or oncoming vehicle M3) is obtained. The lateral speed is the speed of displacement in a direction at right angles to the host vehicle lane TL.

If the preceding vehicle M2 is separated from the host vehicle M1, the overlap ratio between the preceding vehicle M2 and the host vehicle lane (hereinafter referred to as the host vehicle lane overlap ratio) is obtained, as a parameter expressing the risk of collision. The output timing of the PRE collision warning, that has been set based on the driving history of the driver, is changed using the host vehicle lane overlap ratio, That is to say, the smaller the host vehicle lane overlap ratio, the greater is the possibility of a delay in the timing of an avoidance operation by the driver, and hence the outputting the PRE collision warning is changed accordingly, to occur at a later timing.

It can be envisaged that an object that is ahead of the host vehicle (preceding vehicle, oncoming vehicle) could be in a condition of overlapping the host vehicle while straddling a white line and thereby overlapping the host vehicle lane. In such a case, the output timing of the PRE collision warning is selected as either the PRE collision warning timing that is based on the preceding vehicle overlap ratio or the PRE collision warning timing that is based on the host vehicle lane overlap ratio, with the earliest of these output timings being selected. In that way, the PRE collision warnings can be outputted at suitable timings, while preventing interference with operations performed by the driver for avoiding collision.

Returning to FIG. 1, the ECU 10 includes a radar target acquisition section 11, an image object acquisition section 12, a fusion processing section 13, a lateral position correction section 14, a vehicle judgement section 31, a traffic lane acquisition section 32, a displacement condition judgement section 33, a preceding vehicle overlap ratio calculation section 15, a host vehicle lane overlap ratio output section 16, an estimation model generating section 17, a collision warning setting section 18, and a vehicle control section 19.

The radar target acquisition section 11 acquires information on a radar object LT that is detected by the radar apparatus 21. and the image object acquisition section acquires information on image objects GT that are detected by the image capture device 22 at each of prescribed intervals.

The fusion processing section 13 produces a fusion object FSN by combination (fusion) of a radar object LT and an image object GT. Specifically, the position of a fusion object with respect to the advancement direction of the host vehicle is specified from the distance and relative speed of the radar object LT, and the position of the fusion object in the width direction of the host vehicle is specified based on the lateral position and lateral width of the image object GT.

In that way, in a case in which a fusion object FSN is generated by using a radar object LT and an image object GT, and the position of an object is specified based on the fusion object FSN, the position of the object is specified by using either the information acquired by the radar apparatus 21 or the information acquired by the image capture device 22, with the information having the highest accuracy of these being selected, thus enabling the accuracy of identifying the position of the object to be increased.

In a case in which a fusion object FSN is generated, the lateral position of the object along the vehicle width direction can be specified as the lateral position of the fusion object FSN. Alternatively, it would be equally possible to select the lateral position of the object that is the control object as the one of the left-side/right-side lateral positions (left-side position, right-side position), obtained for the image object GT, which is closest to the host vehicle.

It should be noted that in a case in which the host vehicle is travelling around a curve, that will have an effect which will change the lateral separation of the object from the host vehicle. Hence the predicted path estimation section 32, which estimates the curvature of the predicted path of the host vehicle, obtains an estimate R that is the radius of curvature (reciprocal of curvature) of the predicted travel path. The lateral position correction section 14 uses the estimate R to correct the lateral position of the object.

Figure 6:
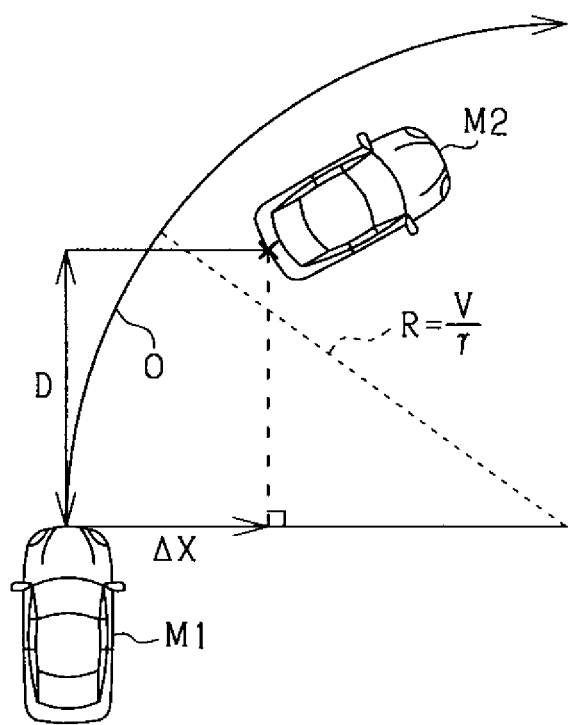
FIG. 6 is a diagram relating to calculation of an estimate R.

Specifically, referring to FIG. 6, the estimate R is calculated as R=V/γ, based on the host vehicle speed V that is detected by the vehicle speed sensor 24 and the yaw rate γ that is detected by the yaw rate sensor 23. The correction value Δx is then calculated as Δx=D·D/2R, using the estimate R and the relative distance D with respect to the preceding vehicle M2. The relative position of the object that is obtained from the FSN lateral position Y1 or from the image object GT is then corrected by using the correction value Δx. On this occasion, the lateral position of the control object of the PCS control can be obtained as the lateral position from which there is the smallest distance to the host vehicle lane O, by comparing the respective lateral values after correction has been applied.

When the host vehicle is halted, with the estimate R at zero, or when the host vehicle is traveling directly forward, with the estimate R greatly exceeding the threshold value, correction by using the Δx is not performed. In that way, for example when it can be considered that the host vehicle is traveling straight ahead, with the estimate R is in a range of high values, the effects of wobbling by the driver can be suppressed, enabling increased accuracy of calculating the PCS lateral position.

In a case in which fusion of the radar object LT and the image object GT is not performed, that is to say, when detection is achieved by only the radar apparatus 21 or the image capture device 22, it would be equally possible to specify the position of an object based on the object information that is acquired by the radar apparatus 21 or is acquired by the image capture device 22. Specifically, in a case in which only the radar object LT is detected, the position (distance, lateral position, etc.) of the object is specified by using the radar object LT. When only the image object GT is detected, the position (distance, lateral position, etc.) of the object can be specified by using the image object GT.

Figure 1B:
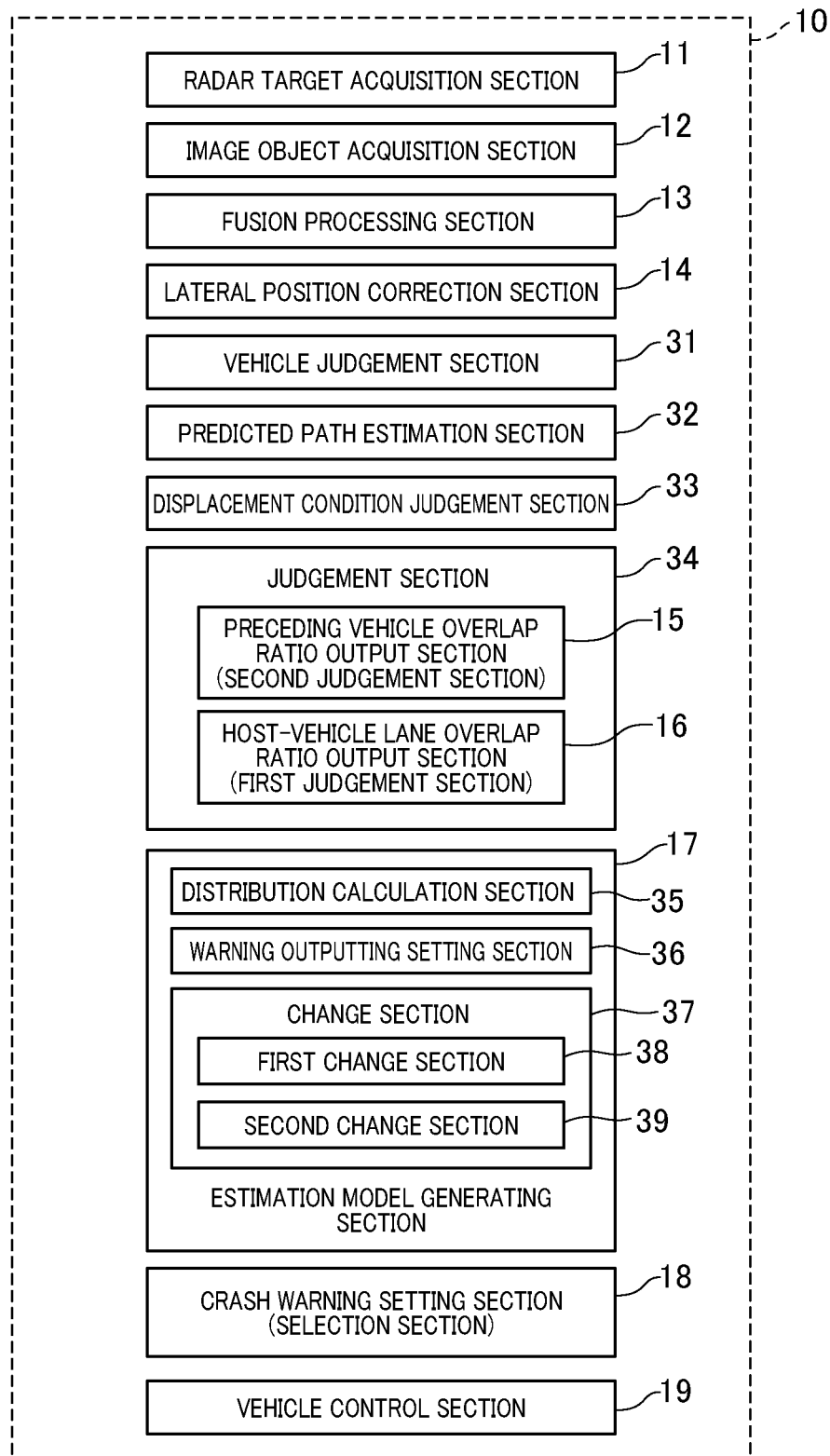
FIG. 1B is a functional block diagram of an ECU in the vehicle control system.

Referring to FIG. 1B, the preceding vehicle overlap ratio calculation section 15 calculates the preceding vehicle overlap ratio as a parameter for expressing the risk of collision.

The preceding vehicle overlap ratio can be calculated, for example, from the avoidance margin width between the host vehicle and the preceding vehicle. The avoidance margin width can be calculated from the vehicle width of the host vehicle and the amount of overlap between the host vehicle and the preceding vehicle in the vehicle width direction. The amount of overlap between the host vehicle and the preceding vehicle in the vehicle width direction can be obtained, for example, by comparing the lateral position of the preceding vehicle with the lateral position of the host vehicle.

Figure 7:
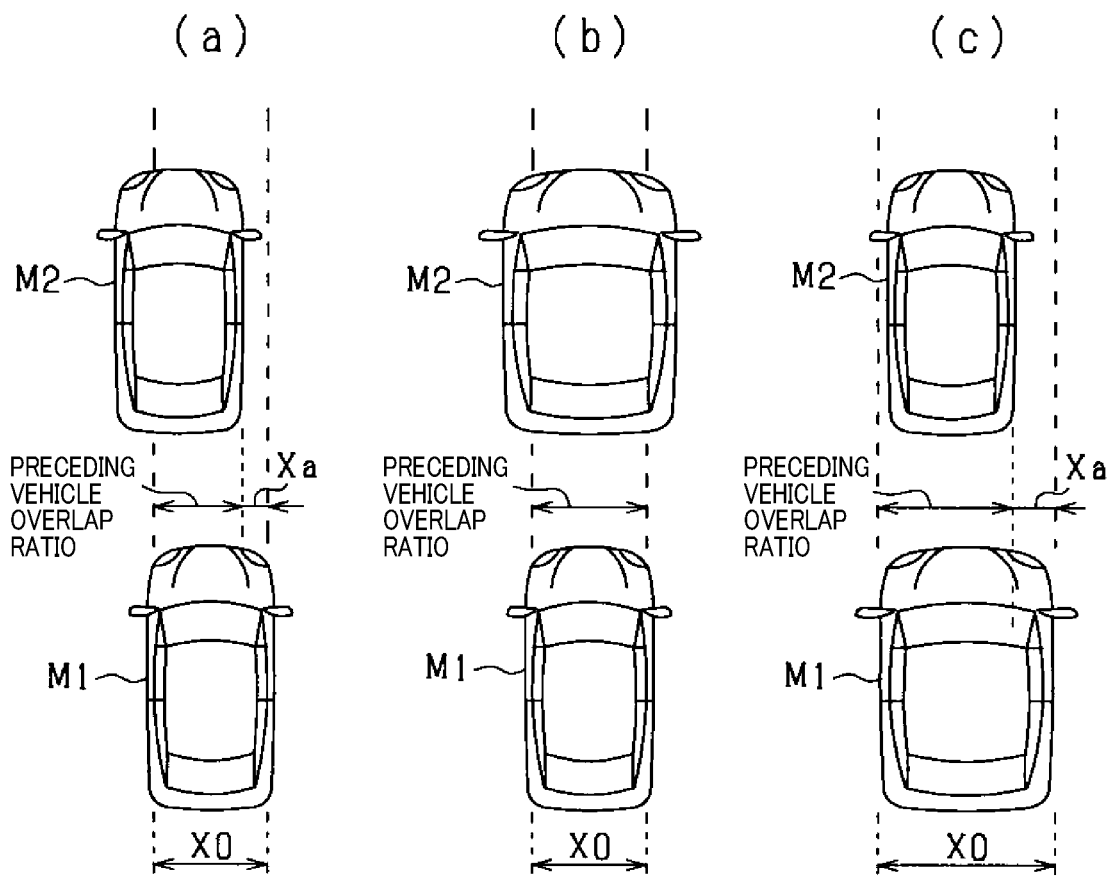
FIG. 7 is a diagram showing types of overlap state between a preceding vehicle and the host vehicle.

The condition of overlap between the host vehicle and the preceding vehicle can be classified into three patterns as shown in FIG. 7, in accordance with the position relationship between the host vehicle and the preceding vehicle, and the magnitude relationship of the respective vehicle widths. That is to say, there is a condition in which the preceding vehicle M2 is offset with respect to the host vehicle M1, as shown in FIG. 7(a). When the vehicle width of the preceding vehicle M2 is greater than the vehicle width of the host vehicle M1, there is a condition in which the preceding vehicle M2 will overlap all of the host vehicle M1, as shown in FIG. 7(b). When the vehicle width of the preceding vehicle M2 is smaller than the vehicle width of the host vehicle M1, there is a condition in which the preceding vehicle M2 is contained within the vehicle width of the host vehicle M1, as shown in FIG. 7(c). These are the three patterns. The respective preceding vehicle overlap ratios of these patterns can be calculated as follows, for example.

In the case of FIG. 7(a), the avoidance margin width Xa is calculated from the difference between the lateral position of the host vehicle M1 and the lateral position of the preceding vehicle M2, and the preceding vehicle overlap ratio is calculated by subtracting the avoidance margin width Xa from the vehicle width X0 of the host vehicle. In the case of FIG. 7(b), since the avoidance margin width Xa of the host vehicle is 0, the preceding vehicle overlap ratio is 100%. In the case of FIG. 7(c), there are avoidance margin widths with respect to the preceding vehicle M2 at the right side and left side of the host vehicle M1, however it can be assumed that the driver will perform an avoidance operation at the side where the avoidance margin width is largest. Hence in such a case, the preceding vehicle overlap ratio is calculated by subtracting the vehicle width X0 of the host vehicle from the larger one of the avoidance margin widths Xa (here, the avoidance margin width Xa at the right side of the host vehicle).

Figure 8:
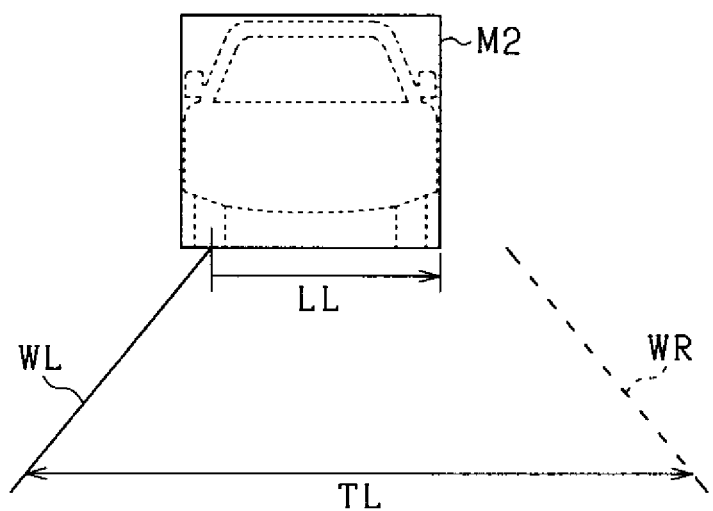
FIG. 8 is a descriptive diagram concerning a host vehicle lane overlap ratio.

The host vehicle lane overlap ratio calculation section 16 shown in FIG. 1B calculates the host vehicle lane overlap ratio as a parameter expressing the risk of collision. The calculation of the host vehicle lane overlap ratio will be described referring to FIG. 8. FIG. 8 shows an image captured by the image capture device 22, with the right-side white line WR and the left-side white line WL of the host vehicle lane TL being detected by image processing of the captured image. The preceding vehicle M2 is detected as a fusion object FSN. In this case, since the preceding vehicle M2 overlaps the left-side white line WL, a width LL in the host vehicle lane, extending inward from the left-side white line WL, is calculated as the host vehicle lane overlap ratio.

It should be noted that as described above, in a case in which the preceding vehicle, etc., is straddling a white line and the preceding vehicle, etc., is moving to an adjacent traffic lane, that is to say, a case in which the preceding vehicle is moving in a direction away from the host vehicle lane, the risk of collision becomes decreased. Hence with this embodiment, when the preceding vehicle is moving laterally in a direction for leaving the host vehicle lane, the output timing of the PRE collision warning is changed, using the host vehicle lane overlap ratio.

The preceding vehicle overlap ratio calculation section 15 and the host vehicle lane overlap ratio calculation section 16 constitute a judgement section 34 (see FIG. 1B), which judges the risk of collision with the host vehicle based on the positions of objects that are ahead of the host vehicle. The preceding vehicle overlap ratio calculation section 16 and the host vehicle lane overlap ratio calculation section 15 respectively correspond to a first judgement section 16 and a second judgement section 15. When there is an object that is in the host vehicle lane overlaps the host vehicle, the first judgement section 16 judges the risk of collision based on the host vehicle lane overlap ratio, which is the overlap ratio between the object and the host vehicle lane, and the second judgement section 15 judges the risk of collision based on the preceding vehicle overlap ratio, which is the overlap ratio between the host vehicle and a preceding vehicle.

The estimation model generating section 17 generates an estimation model, for use in estimating the timings of avoidance operations performed by the driver, by using an equation expressing the frequency distribution of avoidance operations performed by the driver. The model is generated for example by using equation (1) below.

[Math. 1]

$$(Vr + \alpha \cdot Vs + \beta \cdot Ap)/D'' > TPRE \quad (1)$$

In equation (1), Vs is the vehicle speed that is obtained by the vehicle speed sensor 24. D is the relative distance, Vr is the relative speed, and Ap is the relative acceleration, and these can be obtained from the information of the fusion object FSN, etc. $\alpha$ and $\beta$ are coefficients that are determined as appropriate. The output timing of the PRE collision warning is set such that there is no interference between the PRE collision warning and the timing of an avoidance operation that is estimated based on equation (1).

When there is a preceding vehicle overlap ratio, the estimation model generating section 17 obtains the coefficients used in the above equation from the preceding vehicle overlap ratio. The estimation model is then changed by assigning the obtained coefficients to the equation.

Figure 9:
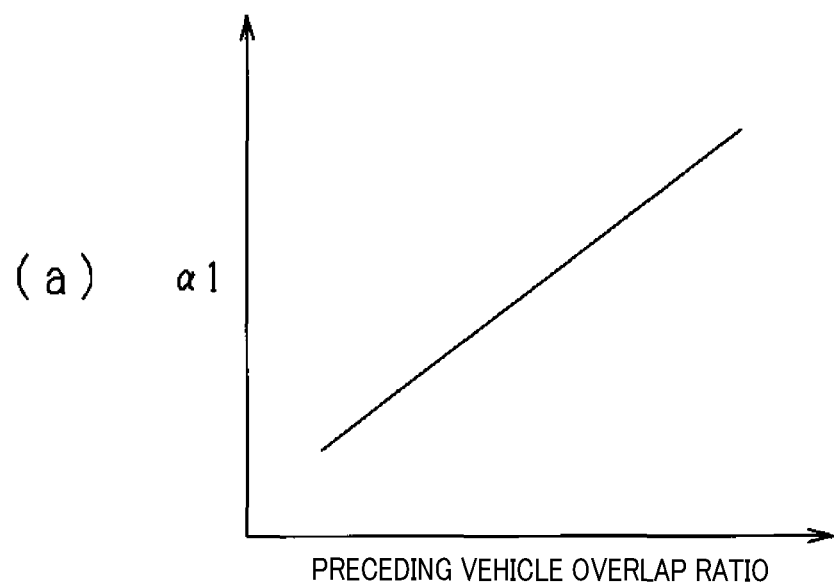
FIG. 9 is a diagram showing a relationship between the overlap ratio and a coefficient $\alpha$ of an estimation model.
Figure 9:
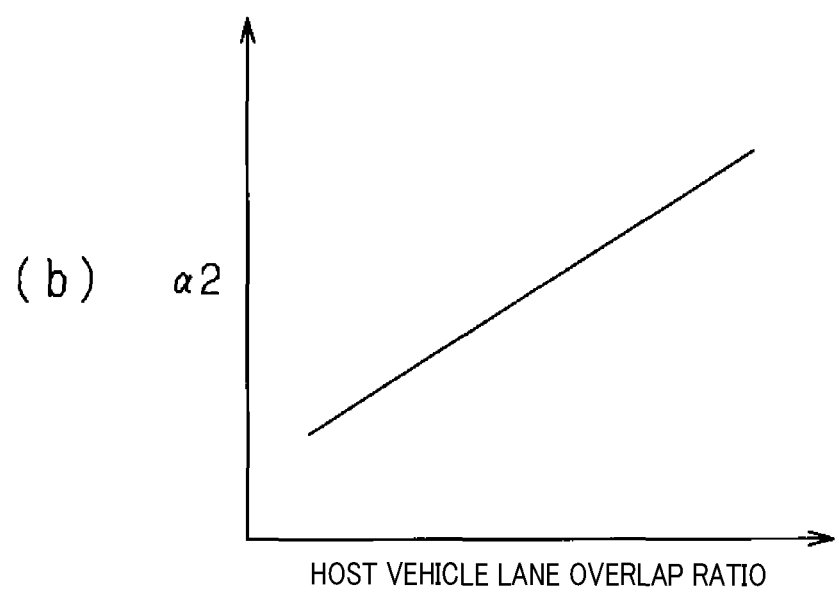

With this embodiment, the estimation model is changed by using a coefficient $\alpha 1$ that is calculated based on the host vehicle overlap ratio, instead of using the coefficient $\alpha$. The coefficient $\alpha 1$ is calculated by using the correlation relationship between the preceding vehicle overlap ratio and $\alpha 1$ that is shown in FIG. 9($a$). As shown in FIG. 9($a$), the smaller the preceding vehicle overlap ratio, the smaller becomes the value set for $\alpha 1$. Hence, as the preceding vehicle overlap ratio becomes smaller, and the risk of collision decreases, the timings that are estimated by the estimation model for the avoidance operations performed by the driver will shift to become increasingly delayed, and the output timing TPER of a PRE collision warning become changed to a delay side. In that way, outputting of unnecessary warnings can be suppressed, together with preventing interference between the avoidance operations performed by the driver and the PRE collision warnings.

Similarly, in a case in which there is a host vehicle lane overlap ratio, the estimation model generating section 17 obtains the coefficient used in the above calculation from the host vehicle lane overlap ratio. Specifically, the estimation model is changed by using a coefficient $\alpha 2$ that is based on the host vehicle lane overlap ratio, instead of the coefficient $\alpha$ of equation (1). The coefficient $\alpha 2$ is calculated by using the correlation relationship shown in FIG. 9($b$) between the host vehicle lane overlap ratio and $\alpha 2$. In FIG. 9($b$), the smaller the host vehicle lane overlap ratio, the smaller becomes the value that is set for $\alpha 2$. For that reason, the lower the risk of collision, as the host vehicle lane overlap ratio becomes smaller, the greater is the extent that the timing of an avoidance operation by the driver, as estimated by the estimation model, becomes shifted to the delay side, and hence the output timing TPER of the PRE collision warning is changed to the delay side. In the above way, interference with operations performed by the driver for avoiding collision can be prevented, and outputting of unnecessary warnings can be restricted.

As shown in FIG. 1($b$), the estimation model generating section 17 includes a distribution calculation section 35, a warning outputting setting section 36 and a change section 37 as respective function blocks.

The distribution calculation section 35 accumulates a history of the timings of avoidance operations that are performed by a driver of the host vehicle with respect to objects which are at prescribed distances ahead of the host vehicle, and calculates the distribution of the timings of the avoidance operations. With this embodiment as described above, an estimation model is used which estimates the timing of an avoidance by the driver by formalizing the distribution of frequency of the avoidance operations performed by the driver.

The warning outputting setting section 36 sets the output timings of warnings to the driver based on the distribution of the timings of avoidance operations, such as not to interfere with the actual avoidance operations performed by the driver. With this embodiment, the output timing of a warning directed to the driver (the output timing TPRE of a PRE collision warnings) is set based on the timing of an avoidance operation as estimated from the estimation model, such as not to interfere with an actual avoidance operation performed by the driver.

The change section 37 changes the output timings of the warnings, set by the judgement section 34, based on the risk of collision with the host vehicle as determined by the judgement section 34. With this embodiment, the risk of collision is determined by the preceding vehicle overlap ratio calculation section 15 and host vehicle lane overlap ratio calculation section 16 of the judgement section 34. When the host vehicle overlaps an object that is in the host vehicle lane in which the host vehicle is traveling, the host vehicle lane overlap ratio calculation section 16 judges the risk of collision based on the host vehicle lane overlap ratio, which is the overlap ratio between an object and the host vehicle lane, and the preceding vehicle overlap ratio output section 15 judges the risk of collision based on the preceding vehicle overlap ratio, which is the overlap ratio between the host vehicle and a preceding vehicle. The change section 37 includes a first change section 38 which changes the output timings of warnings based on the host vehicle lane overlap ratio, from the judgement section 34, and a second change section 39 which changes the output timings of warnings based on the preceding vehicle overlap ratio, from the judgement section 34.

The collision warning setting section 18 functions as a selection section, which selects the output timing of a PRE collision warning that is calculated based on the preceding vehicle overlap ratio by the second change section 39 or the output timing of the PRE collision warning that is calculated based on the host vehicle lane overlap ratio by the first change section 38, when there are both of these output timings of the PRE collision warning, with the earliest one of the warning timings being selected. That is to say, when a plurality of output timings of the PRE collision warning are calculated, priority is given to the output timing corresponding to the highest degree of risk. In that way, appropriate warnings can be given to the driver, while preventing outputting of unnecessary warnings.

The vehicle control section 19 calculates the TTC (Time To Collision) based on the relative position and relative speed of a preceding vehicle, etc., with respect to the host vehicle. When the TTC corresponds to the output timing of the PRE collision warning that is set by the collision warning setting section 18, an operation command is outputted to the warning device 40. It should be noted that the TTC may be calculated by also taking into consideration the relative acceleration of the preceding vehicle, etc., with respect to the host vehicle.

Figure 10:
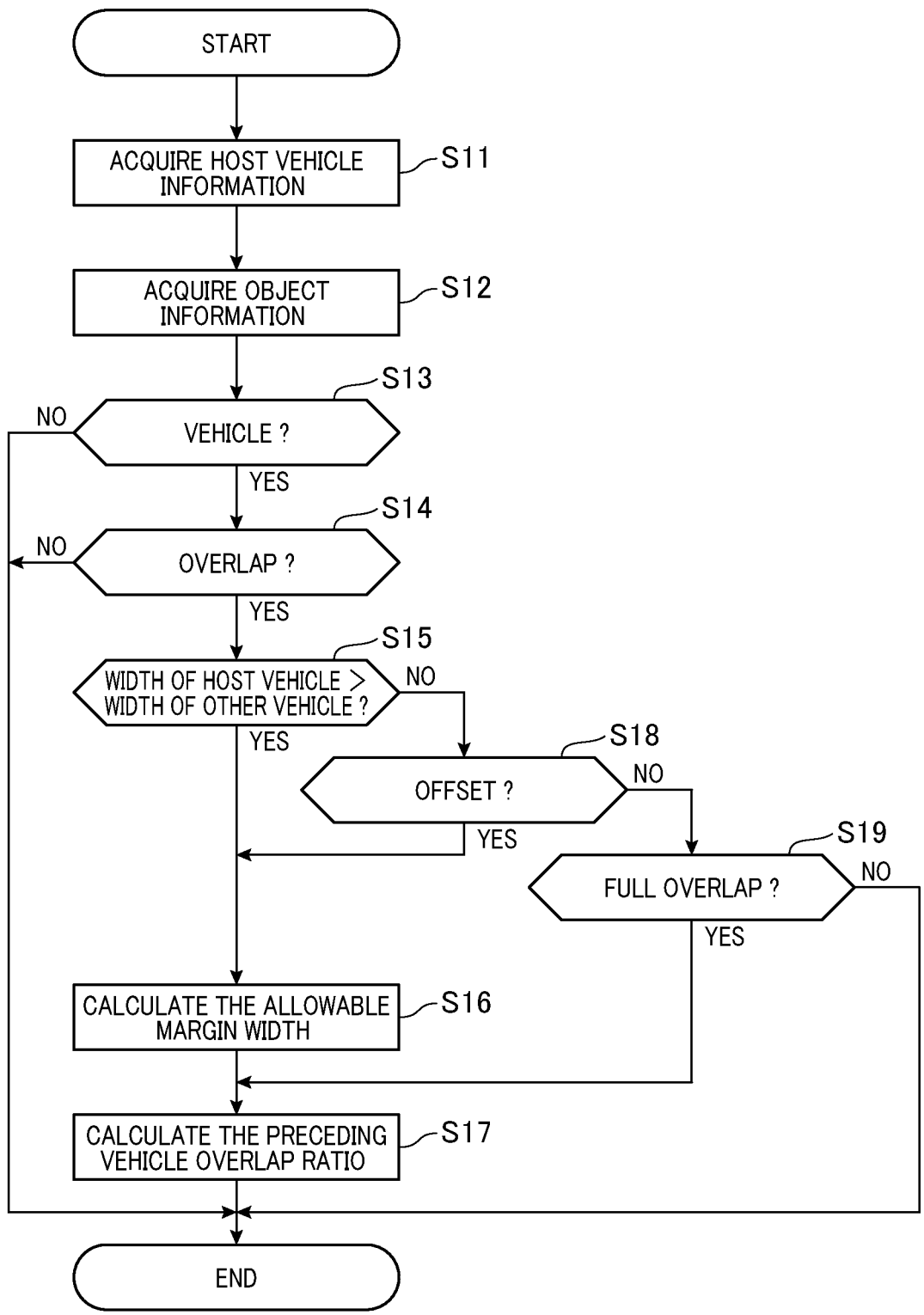
FIG. 10 is a flow diagram of calculation processing of a preceding vehicle overlap ratio.
Figure 11:
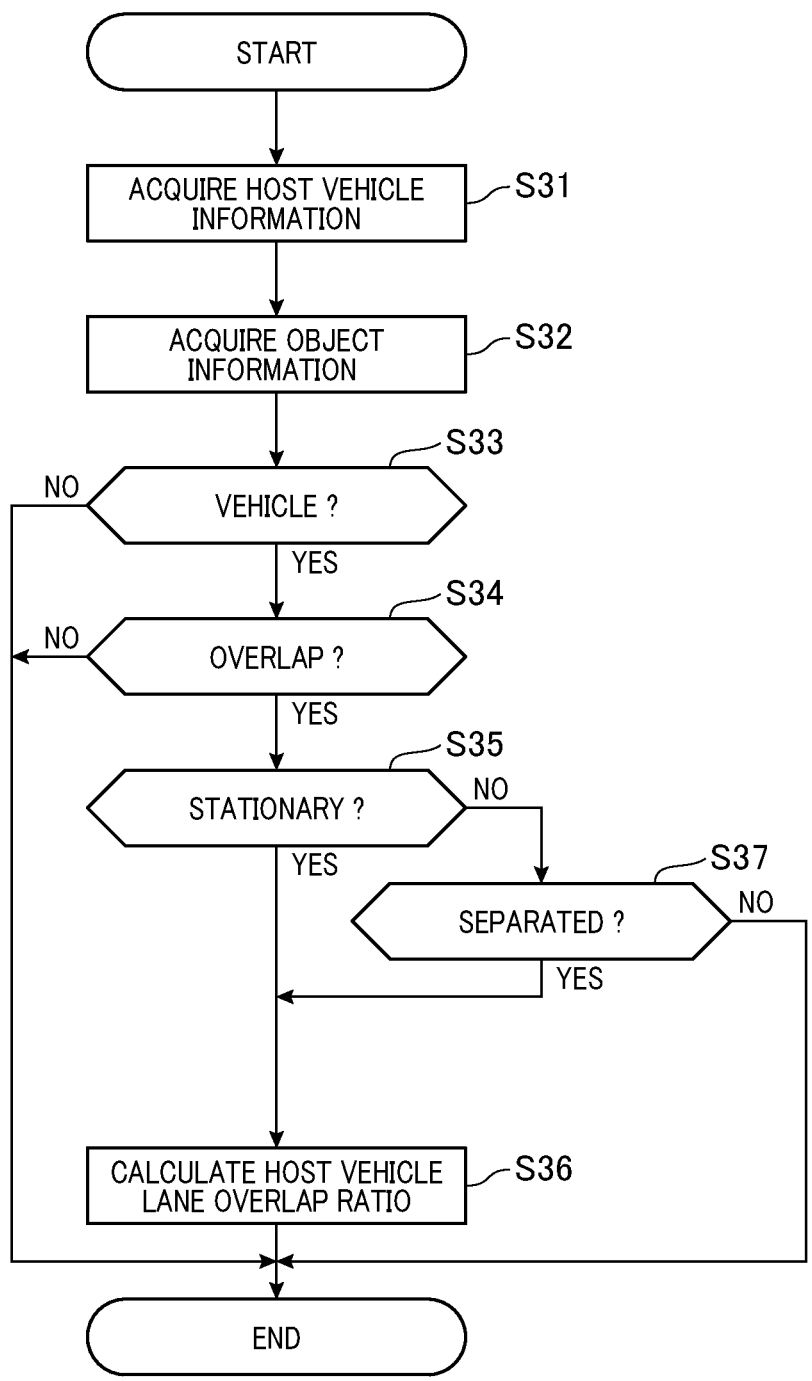
FIG. 11 is a flow diagram of calculation processing of a host vehicle lane overlap ratio.
Figure 12:
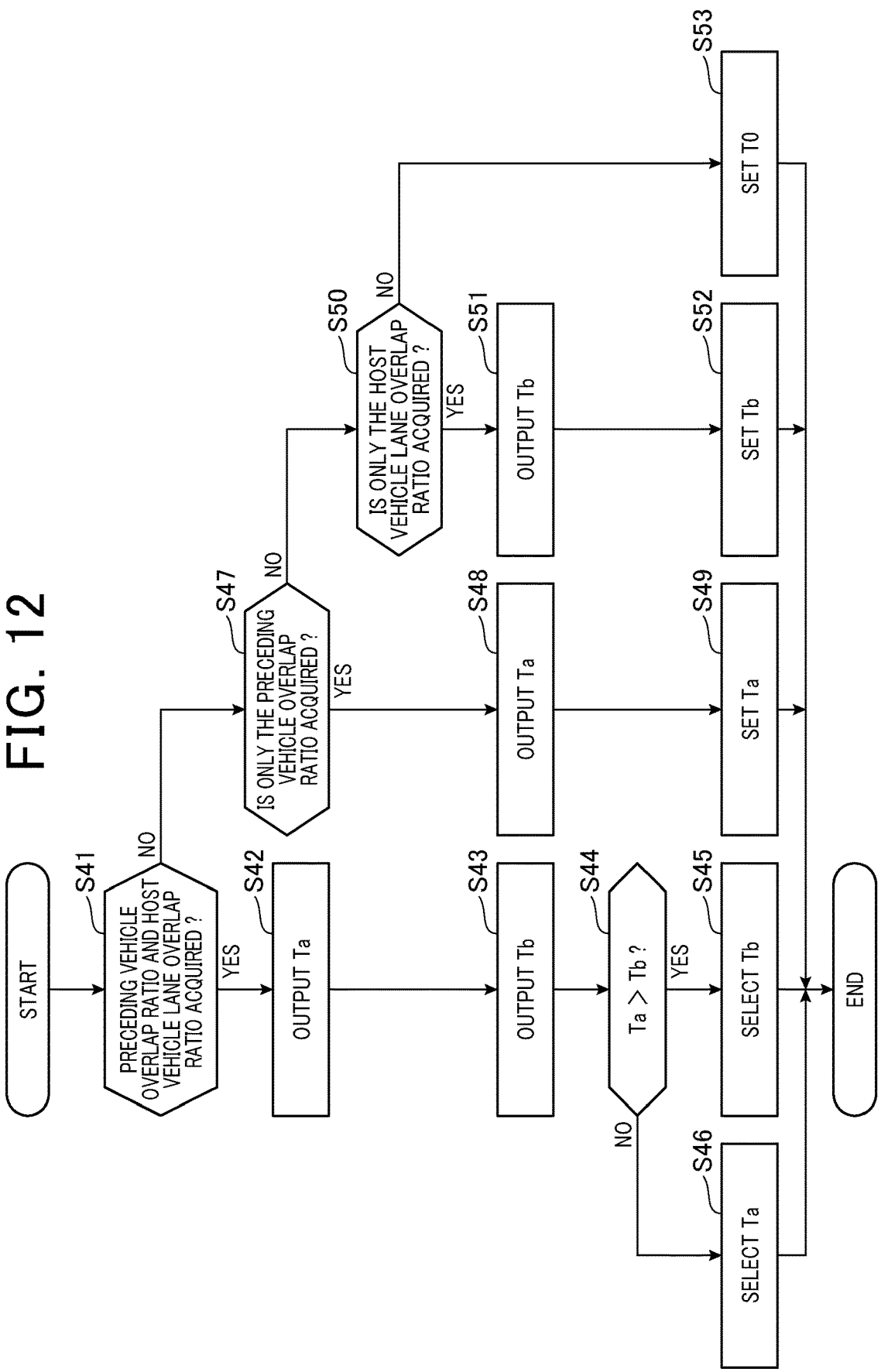
FIG. 12 is a flow diagram of processing for calculating the output timings of collision warnings.
Figure 13:
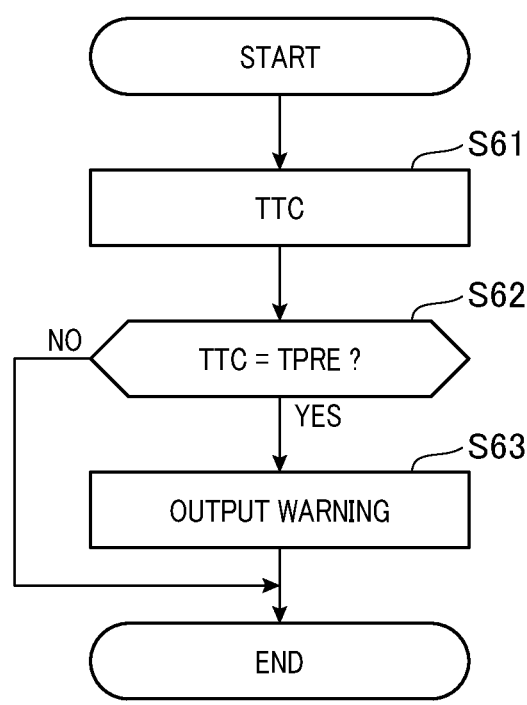
FIG. 13 is a flow diagram of output processing of warnings.

An example of the calculation processing executed by the ECU 10 will be described referring to FIGS. 10 to 13. FIG. 10 is a flow diagram of calculation processing of the preceding vehicle overlap ratio. FIG. 11 is a flow diagram of calculation processing of the host vehicle lane overlap ratio. FIG. 12 is a flow diagram of calculation processing of the output timing of the PRE collision warning. FIG. 13 is a flow diagram of processing for outputting warnings, by the PCS control of the present embodiment. Each of the processing sequences is executed repetitively by the ECU 10, with a prescribed repetition period.

Referring to FIG. 10, in step S11 the ECU 10 obtains information on the host vehicle. The speed, steering angle, acceleration and deceleration, etc of the host vehicle are obtained as the host vehicle information.

Next in step S12, the ECU 10 obtains information on objects such as preceding vehicles, etc. With the present embodiment, the information obtained on such an object includes the relative distance, relative speed, relative lateral position, and vehicle width, etc., of the object, derive from a fusion object FSN or the like. Next in step S13, the ECU 10 judges whether or not the object is a vehicle. In this processing, prescribed types of object (other vehicles, pedestrians, obstacles in the road, etc.,) that are within the captured image range are detected, using a known type of image processing such as template matching, etc., applied to the captured images from the image capture device 22, and the vehicle judgement section 31 performs judgement based on the detection results.

If there is a YES decision in step S13, the ECU 10 judges in step S14 whether or not another vehicle (for example a preceding vehicle) overlaps the host vehicle. In this processing, the judgement can be made based on the position relationship of the lateral position of the host vehicle to the lateral position of the other vehicle. If it is judged in step S14 that the other vehicle overlaps the host vehicle, then the preceding vehicle overlap ratio is calculated, in steps S15 to S19.

Firstly in step S15, the ECU 10 judges whether or not the vehicle width of the preceding vehicle is less than the vehicle width of the host vehicle. With the judgement being based on results of detecting the lateral position and lateral width of the object, obtained from the fusion object FSN, etc. If there is a YES decision in step S15, then in step S16 the ECU 10 calculates the allowable margin widths to the left and to the right of the preceding vehicle with respect to the host vehicle. The allowable margin widths can be obtained by respectively comparing the left-side and right-side lateral positions of the host vehicle with the left-side and right-side lateral positions of the preceding vehicle, and calculating the differences between them. Next in step S17, the ECU 10 calculates the preceding vehicle overlap ratio, using the largest one of the left-side and right-side allowable margin widths.

If there is a NO decision in step S15, then in step S18 the ECU 10 judges whether or not there is an offset of the preceding vehicle with respect to the host vehicle. The decision as to whether or not there is an offset can be made based on the judgement results of the lateral position of the object, obtained from the fusion object FSN, etc. If it is judged that there is an offset in step S18, then operation proceeds to step S16, in which the allowable margin width is calculated. In that case, the allowable margin width is calculated for the side at which the preceding vehicle is offset with respect to the host vehicle. The ECU 10 then calculates the preceding vehicle overlap ratio in step S17, using the allowable margin width.

If there is a NO decision in step S18, then operation proceeds to step S19 in which the ECU 10 judges whether or not there is a full overlap (overlap ratio of 100%) of the preceding vehicle by the host vehicle. If it is judged in step S19 that there is a full overlap of the preceding vehicle by the host vehicle, then operation proceeds to step S17 in which the ECU 10 sets the preceding vehicle overlap ratio at 100%. If there is a NO decision in step S13 or S14, then the processing is ended.

The processing for calculating the host vehicle lane overlap ratio is next described, referring to FIG. 11.

Firstly, in step S31, the ECU 10 obtains information on the host vehicle. The speed, steering angle, acceleration and deceleration, etc of the host vehicle are obtained as the host vehicle information. Next in step S32 the ECU 10 obtains information on objects such as preceding vehicles, etc. With the present embodiment, the information obtained on such an object includes the relative distance, relative speed, relative lateral position, and vehicle width, etc., of the object, derived from a fusion object FUSION, etc.

Next, in step S33, the ECU 10 judges whether or not the object is a vehicle. In this processing, specific types of object (other vehicles, pedestrians, obstacles in the road, etc.,) that are within the captured image range are detected, using a known type of image processing such as template matching, etc., that is applied to the captured images from the image capture device 22, and the vehicle judgement section 31 performs judgement based on the detection results.

If there is a YES decision in step S33, the ECU 10 judges in step S34 whether or not the vehicle concerned (other vehicle) overlaps one of the white lines of the host vehicle lane. In this processing, the judgement can be made based on the relationship between the lateral position of the host vehicle and the positions of the white lines.

If there is a YES decision in step S34, then a decision is made in step S35 as to whether or not the other vehicle is in a stationary condition. In this processing, a YES decision is made if the lateral velocity of the other vehicle is zero. If the other vehicle is in a stationary condition, operation proceeds to step S36.

If it is judged in step S35 that the other vehicle is not in a stationary condition, then a decision is made in step S37 as to whether or not the other vehicle is separated from the host vehicle. If there is a NO decision in step S37, the processing is ended. If there is a YES decision in step S37 then in step S36 the ECU obtains the host vehicle lane overlap ratio, as the width by which the other vehicle extends into the host vehicle lane, from a white line. If there is a NO decision in step S33 or S34 then the processing is ended.

Next, the processing for calculating the PRE collision warning will be described referring to FIG. 12. The processing is executed for each of respective vehicles that are ahead of the host vehicle.

Firstly in step S41, the ECU 10 judges whether or not the preceding vehicle overlap ratio and the host vehicle lane overlap ratio have both been obtained. If there is a YES decision, then in step S42 the ECU 10 calculates an output timing TPRE=Ta for the PRE collision warning, using the estimation model that is calculated using the coefficient $\alpha 1$, obtained from the preceding vehicle overlap ratio. Furthermore in step S43, the ECU 10 calculates an output timing TPRE=Tb for the PRE collision warning, using the estimation model that is calculated using the coefficient $\alpha 2$, obtained from the host vehicle lane overlap ratio. The ECU 10 then judges whether or not the output timing Ta>Tb, in step S44, i.e., judges whether or not the output timing Tb is earlier than the output timing Ta. If there is a YES decision in step S44, the ECU 10 sets Tb as the output timing of the PRE collision warning, in step S45. If there is a NO decision in step S44, the ECU 10 sets Ta as the output timing of the PRE collision warning, in step S46.

If there is a NO decision in step S41, the ECU 10 judges in step S47 whether or not only the preceding vehicle overlap ratio has been obtained. If there is a YES decision in step S47, then in step S48 the ECU 10 calculates the output timing Ta for the PRE collision warning by using the estimation model with the coefficient $\beta 1$, that is calculated from the preceding vehicle overlap ratio. The ECU 10 then sets the output timing Ta as the output timing of the PRE collision warning, in step S49.

If there is a NO decision in step S47, the ECU 10 judges in step S50 whether or not only the host vehicle lane overlap ratio has been obtained. If there is a YES decision in step S50, then in step S51 the ECU 10 calculates the output timing Tb for the PRE collision warning by using the estimation model with the coefficient $\alpha 2$, that is calculated from the host vehicle lane overlap ratio. The ECU 10 then sets the output timing Tb as the output timing of the PRE collision warning in step S52.

If there is a NO decision in step S50, then in step S53 the ECU 10 sets the output timing of the PRE collision warning as the output timing TPRE=T0, calculated by using an estimation model that is calculated using a value of $\alpha$ (initial value) which has been appropriately determined.

Next the warning output processing performed by the ECU 10 will be described referring to FIG. 13.

Firstly in step S61 the ECU 10 calculates the collision margin time TTC (Time to Collision) for the host vehicle with respect to the object (preceding vehicle, etc.). The TTC can for example be calculated based on the relative position and relative speed between the host vehicle and the preceding vehicle, or may be calculated by also taking into consideration the relative acceleration.

Next in step S62, the ECU 10 judges whether or not the TTC calculated in step S61 is equal to the output timing TPRE of the PRE collision warning. If there is a NO decision in step S62, then the processing is ended. If there is a YES decision in step S62, then the ECU 10 outputs the PRE collision warning, in step S63.

The following effects are provided by the present invention.

(A1) History is accumulated of the timings at which the driver has performed avoidance operations with respect to objects (preceding vehicles, etc.) which are at prescribed distances ahead of the host vehicle, and the distribution of the timings of the avoidance operations is calculated. The output timing of a warning to the driver is set based upon the calculated distribution of the timings of avoidance operations, such as to prevent interference between the warnings and an avoidance operation actually performed by the driver. In that way, outputting of unnecessary warnings can be prevented, by taking statistical data relating to the driver into consideration.

However in a situation in which the risk of collision between the host vehicle and an object is low, and the driver notices the object, it is conceivable that an avoidance operation may be intentionally delayed. Hence if the output timings of warnings are set based on the distribution of the timings of avoidance operations performed by the driver, there is a risk that interference may occur between a warning and an avoidance operation performed by the driver, and feelings of unease may be imparted to the driver.

Hence, the risk of collision by the host vehicle with an object that is ahead of the host vehicle is judged based on the position of the object. The output timing of a warning, which had been set based on the distribution of timings of avoidance operations, is then changed based on the judgement results. Interference with operations performed by the driver for avoiding collision can thereby be prevented, while suppressing outputting of unnecessary warnings.

(A2) In a case in which the object overlaps the host vehicle lane, the risk of collision with the host vehicle varies in accordance with the host vehicle lane overlap, which is the overlap ratio between the object and the host vehicle lane. Since the output timing of a warning is based on the host vehicle lane overlap ratio, interference with operations performed by the driver for avoiding collision can be prevented, and outputting of unnecessary warnings restricted, by taking into consideration the host vehicle lane overlap ratio.

(A3) In a case in which an object in the host vehicle lane is moving across a white line into another traffic lane, then since the risk of collision with the host vehicle becomes decreased, if the driver notices the object ahead of the host vehicle in such a condition, it is conceivable that an avoidance operation may be intentionally delayed. However, the smaller the host vehicle lane overlap ratio, the greater is an amount of delay that is set for the output timing of the warning, and hence increased effectiveness in restricting unnecessary warnings can be achieved, in accordance with the possibility of collision with the host vehicle.

(A4) In a case in which the object overlaps the host vehicle lane, and the object is moving laterally in a direction away from the host vehicle, then since the risk of collision with the host vehicle becomes decreased, if the driver notices the object ahead of the host vehicle in such a condition, it is conceivable that an avoidance operation may be intentionally delayed. However this situation is set as a condition whereby the output timing of a warning is delayed by an amount in accordance with the host vehicle lane overlap ratio, and hence the outputting of unnecessary warnings to the driver can be restricted, by taking into consideration the state of proximity of the object to the host vehicle.

(A5) In a case in which a preceding vehicle and the host vehicle overlap in the host vehicle lane, the risk of collision with the host vehicle varies in accordance with the overlap ratio between the host vehicle and the preceding vehicle. Since the output timing of a warning is made to vary in accordance with the preceding vehicle overlap ratio, interference with operations performed by the driver for avoiding collision can be prevented, while the outputting of unnecessary warnings can be restricted.

(A6) The smaller the preceding vehicle overlap ratio, the greater will be the possibility that the driver will delay performing avoidance. However by changing the output timing of a warning such that, as the preceding vehicle overlap ratio becomes smaller, the output timing is increasingly delayed, the effect of restricting unnecessary warnings can be enhanced.

(A7) In a case in which the object overlaps the host vehicle lane and also overlaps the host vehicle, the output timing of a warning will change based on the preceding vehicle overlap ratio and on the host vehicle lane overlap ratio, respectively. In that case, the earliest one of the warning output timings is selected, and hence, warnings can be appropriately given to the driver, while restricting the outputting of unnecessary warnings.

(A8) In a case in which the risk of collision is judged based on the lateral position of an object, it is desirable that the lateral position can be calculated to a high degree of accuracy. The curvature (estimated curve) of the predicted path of the host vehicle is estimated, each of the lateral positions of respective objects is corrected based on the curvature, and the risk of collision is judged by using the corrected lateral positions. The risk of collision with an object can thereby be judged more accurately.

(A9) When the host vehicle is travelling along a path having a curvature that is above a prescribed threshold value, it is determined that correction of the lateral position will not be performed, and hence the processing load can be reduced while enabling the output timings of warnings to be appropriately set.

(A10) By limiting the objects that are to be avoided by the driver of the host vehicle to vehicles, the outputting of unnecessary warnings of other objects that are in the host vehicle lane can be restricted.

Modified Examples

The present invention is not limited to the above embodiment, and could equally be implemented in the following ways. In the following description, constituent elements that are similar to those above are designate by the same drawing designations as in the above description, and detailed description of these is omitted.

(M1) With the above embodiment, avoidance control is performed on the premise that a preceding vehicle, etc., is detected as a FUSION target. However, the above processing could equally be executed by using information on a radar object LT that is detected by the radar apparatus 21 or on an image object GT that is detected by the image capture device 22.

(M2) With the above embodiment, the output timing of a PRE collision warning is changed on condition that a preceding vehicle overlaps a white line and is moving in a direction away from the host vehicle, however it would be equally possible to change the output timing of a PRE collision warning on condition only that the preceding vehicle overlaps the host vehicle lane.

(M3) With the above embodiment, an object that is ahead of the host vehicle is specified by using a plurality of detection apparatuses, i.e., the radar apparatus 21 and the image capture device 22, however it would be equally possible to provide only either one of the radar apparatus 21 and the image capture device 22.

(M4) With the above embodiment, an example is shown of changing the coefficient $\alpha$ of equation (1) based on the preceding vehicle overlap ratio or on the host vehicle lane overlap ratio. However apart from that, it would be equally possible for the apparatus to be such that the estimation model is changed in accordance with the risk of collision by changing another coefficient of equation (1) (for example $\beta$, etc.) based on the preceding vehicle overlap ratio or on the host vehicle lane overlap ratio.

(M5) With the above embodiment, an example is shown whereby a model of the avoidance operations by the driver is obtained by monitoring the timings of brake pedal actuations, as avoidance operations performed by the driver. However apart from that, it would be equally possible for the model of the avoidance operations by the driver to be obtained by monitoring the timings at which steering operations are performed, as avoidance operations by the driver.

(M6) With the above embodiment, the distribution of frequency of avoidance operations performed by the driver is formalized. However apart from that, it would be equally possible for the distribution of frequency of avoidance operations performed by the driver to be expressed by a map, etc. In that case, the output timing TPRE of a PRE collision warning would be set such that interference does not occur between the timing of an avoidance operation performed by the driver and a PRE collision warning, by using the map, etc.

The invention claimed is:

1. A vehicle control apparatus comprising:
a distribution calculation section that accumulates a history of the timings of avoidance operations performed by a driver of a host vehicle with respect to objects which are at prescribed distances ahead of the host vehicle, and calculates a distribution of the timings of the avoidance operations;
a warning outputting setting section which sets the output timing of a warning to the driver, based on the distribution of the timings of the avoidance operations, such that interference does not occur between the avoidance operation and an avoidance operation that is actually performed by the driver;
a judgement section which judges a risk of collision with the host vehicle based upon a position of an object that is ahead of the host vehicle; and
a change section which changes the output timing of the warning that is set by the warning outputting setting section such that interference does not occur between an avoidance operation that is performed by the driver and the output timing of the warning, with the output timing being increasingly changed to a delay side in accordance with decrease of the risk, and with the change being based on results of the judgement of the risk of collision with the host vehicle.

2. The vehicle control apparatus according to claim 1, wherein
when the object overlaps a host vehicle lane in which the host vehicle is travelling, the judgement section judges the risk of collision based on a host vehicle lane overlap ratio, which is a ratio of overlap between the object and the host vehicle lane, and
the change section changes the output timing of the warning based upon the host vehicle lane overlap ratio.

3. The vehicle control apparatus according to claim 2, wherein the smaller the host vehicle lane overlap ratio becomes, the greater is made an extent to which the change section changes the output timing of the warning to a delay side.

4. The vehicle control apparatus according to claim 2, comprising a displacement condition judgement section configured to, in a case in which the object overlaps the host vehicle lane, judge whether the object is approaching or is separating from the host vehicle in a lateral direction that is at right angles to the host vehicle lane;
    and wherein the change section changes the output timing of the warning to the delay side in accordance with the host vehicle lane overlap ratio, on condition that it is judged that the object is approaching the host vehicle.

5. The vehicle control apparatus according to claim 1, wherein the judgement section judges the risk of collision based on a preceding vehicle overlap ratio, which is a ratio of overlap between the host vehicle and a preceding vehicle;
    and wherein the change section changes the output timing of the warning based on the preceding vehicle overlap ratio.

6. The vehicle control apparatus according to claim 5, wherein the smaller the preceding vehicle overlap ratio becomes, the greater is made an extent to which the change section changes the output timing of the warning to the delay side.

7. The vehicle control apparatus according to claim 1, wherein
    the judgement section comprises a first judgement section which, when there is overlap between the object and a host vehicle lane in which the host vehicle is travelling, judges the risk of collision based on a host vehicle lane overlap ratio, which is a ratio of overlap between the object and the host vehicle lane, and comprises a second judgement section which, when there is overlap between the host vehicle and a preceding vehicle, judges the risk of collision based on a preceding vehicle overlap ratio, which is a ratio of overlap between the host vehicle and the preceding vehicle, and
    the judgement section comprises a first change section which changes the output timing of the warning based on the host vehicle lane overlap ratio and a second change section which changes the output timing of the warning based on the preceding vehicle overlap ratio;
    and comprising a selection section which selects, as the output timing of the warning, the earliest one of the warning output timings that are respectively changed by the first change section and by the second change section.

8. The vehicle control apparatus according to claim 1, wherein the judgement section judges the risk of collision based on the lateral position of the object with respect to the host vehicle, and comprising
    a predicted path estimation section which estimates, from a curvature of the estimated path of the host vehicle, a radius of curvature that is the reciprocal of the curvature; and
    wherein the vehicle control apparatus comprises a lateral position correction section which corrects the lateral position of the object based on the radius of curvature of the estimated path of the host vehicle.

9. The vehicle control apparatus according to claim 8, wherein when the host vehicle is travelling straight ahead, with the curvature greater than a prescribed threshold value, the lateral position correction section does not execute correction of the lateral position.

10. The vehicle control apparatus according to claim 1, comprising a vehicle judgement section which judges whether or not an object that is ahead of the host vehicle is a vehicle, and wherein the change section changes the timing of the warning on condition that the object is a vehicle.

11. The vehicle control apparatus according to claim 1, wherein the avoidance comprises a braking operation or a steering operation performed by the driver.

12. A vehicle control apparatus comprising:
    a distribution calculation section that accumulates a history of the timings of avoidance operations performed by a driver of a host vehicle with respect to objects which are at prescribed distances ahead of the host vehicle, and calculates a distribution of the timings of the avoidance operations;
    a warning outputting setting section which sets the output timing of a warning to the driver, based on the distribution of the timings of the avoidance operations, such that interference does not occur between the avoidance operation and an avoidance operation that is actually performed by the driver;
    a judgement section which judges a risk of collision with the host vehicle based upon a position of an object that is ahead of the host vehicle; and
    a change section which changes the output timing of the warning that is set by the warning outputting setting section, with the change being based on the risk of collision with the host vehicle;
    wherein when the object overlaps a host vehicle lane in which the host vehicle is travelling,
    the judgement section judges the risk of the collision based on a host vehicle lane overlap ratio, which is an overlap ratio between the object and the host vehicle lane, and
    the change section changes the output timing of the warning based on the host vehicle lane overlap ratio.

13. A vehicle control apparatus comprising:
    a distribution calculation section that accumulates a history of the timings of avoidance operations performed by a driver of a host vehicle with respect to objects which are at prescribed distances ahead of the host vehicle, and calculates a distribution of the timings of the avoidance operations,
    a warning outputting setting section which sets the output timing of a warning to the driver, based on the distribution of the timings of the avoidance operations, such that interference does not occur between the avoidance operation and an avoidance operation that is actually performed by the driver, and
    a judgement section which judges a risk of collision with the host vehicle based upon a position of an object that is ahead of the host vehicle;
    wherein the judgement section comprises a first judgement section which, when there is overlap between the object and a host vehicle lane in which the host vehicle is travelling, judges the risk of collision based on a host vehicle lane overlap ratio, which is a ratio of overlap between the object and the host vehicle lane, and comprises a second judgement section which, when there is overlap between the host vehicle and a preceding vehicle, judges the risk of collision based on a preceding vehicle overlap ratio, which is a ratio of overlap between the host vehicle and the preceding vehicle, and
    the judgement section comprises a first change section which changes the output timing of the warning based on the host vehicle lane overlap ratio and a second change section which changes the output timing of the warning based on the preceding vehicle overlap ratio;
    and comprising means for selecting, as the output timing of the warning, the earliest one of the warning output timings that are respectively changed by the first change section and by the second change section.

\* \* \* \* \*